Dec. 23, 1924.

T. J. ENTWISLE ET AL 1,520,285

VALVED OUTLET EQUIPMENT FOR TANK CARS

Filed July 1, 1922    5 Sheets-Sheet 3

Witnesses:
F. L. Fox,
H. Berman

Inventors
T. J. Entwisle,
Henry P. O'Mara,
J. W. Donnelly
By Clarence A. O'Brien
Attorney

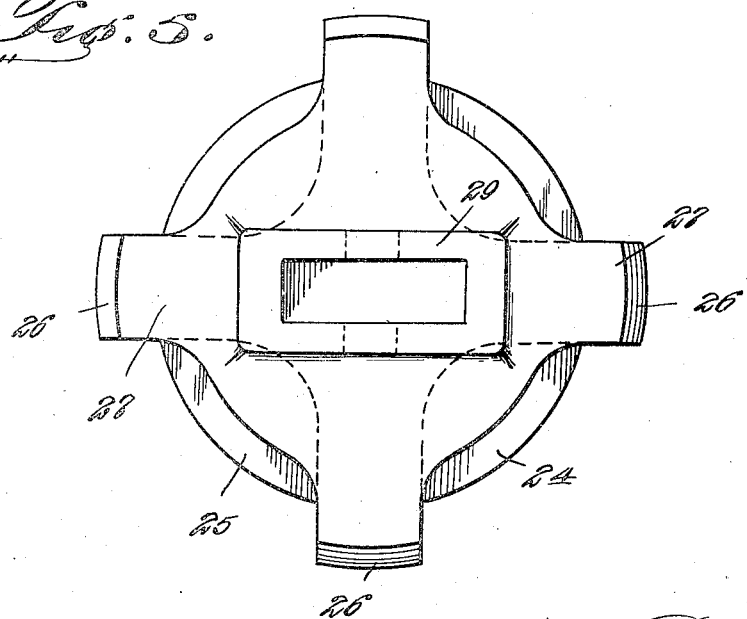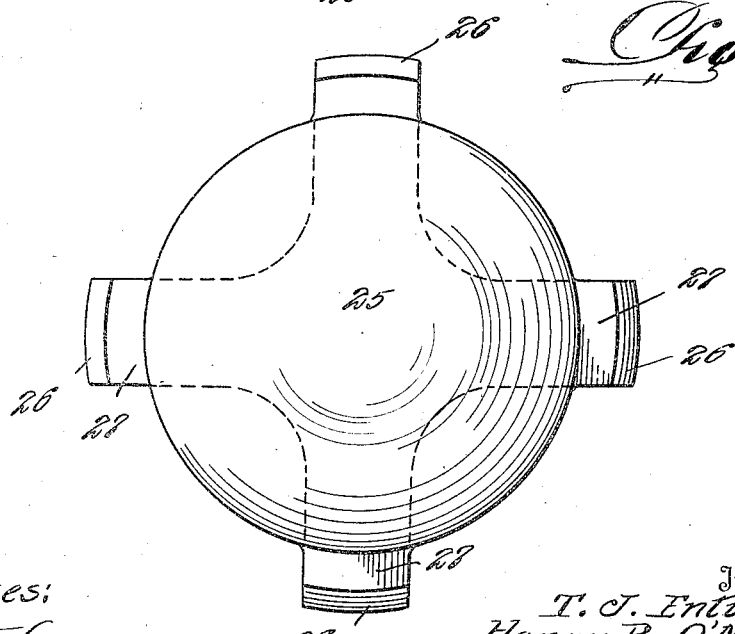

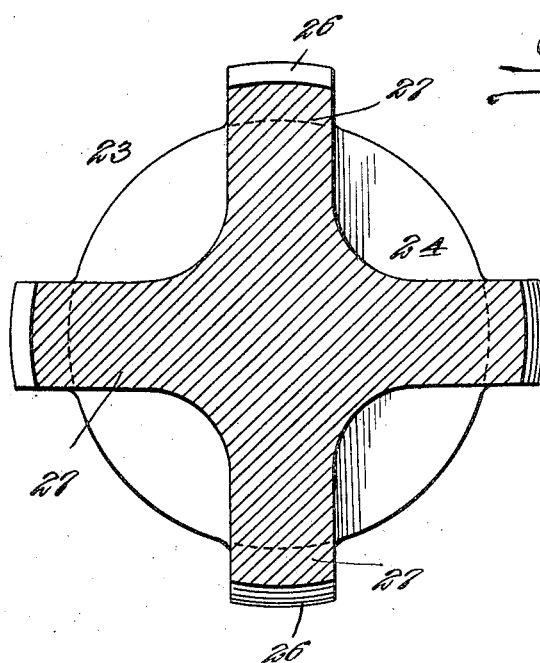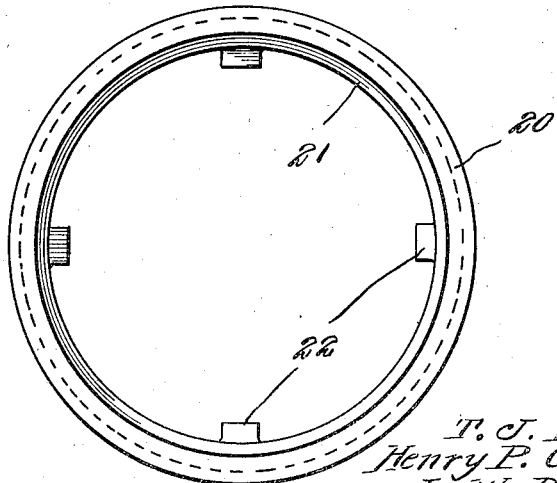

Patented Dec. 23, 1924.

1,520,285

UNITED STATES PATENT OFFICE.

THOMAS J. ENTWISLE, HENRY P. O'MARA, AND JOSEPH W. DONNELLY, OF NEW ORLEANS, LOUISIANA; SAID DONNELLY AND SAID O'MARA ASSIGNORS OF ELEVEN FORTY-EIGHTHS TO SAID ENTWISLE AND ONE-SIXTEENTH TO EDWARD L. MARTIN, OF NEW ORLEANS, LOUISIANA.

VALVED-OUTLET EQUIPMENT FOR TANK CARS.

Application filed July 1, 1922. Serial No. 572,272.

*To all whom it may concern:*

Be it known that we, THOMAS J. ENTWISLE, HENRY P. O'MARA, and JOSEPH W. DONNELLY, citizens of the United States, residing at New Orleans, in the parish of Orleans and State of Louisiana, have invented new and useful Improvements in Valved-Outlet Equipments for Tank Cars, of which the following is a specification.

One object of our said invention is the provision of a thoroughly practical efficient and durable valved outlet equipment designed more especially for the tanks of tank cars and characterized by means for assuring proper seat on the outlet-control valve before the closure member or dome can be applied—i. e., connected with the dome.

Another object of the invention is the provision of a highly advantageous outlet-control valve and valve casing which are preferably removable with a view to prolonging the usefulness and efficiency of the equipment as a whole.

To the attainment of the foregoing, the invention consists in the improvement as hereinafter described and definitely claimed.

In the accompanying drawings, forming part of this specification:—

Figure 1:
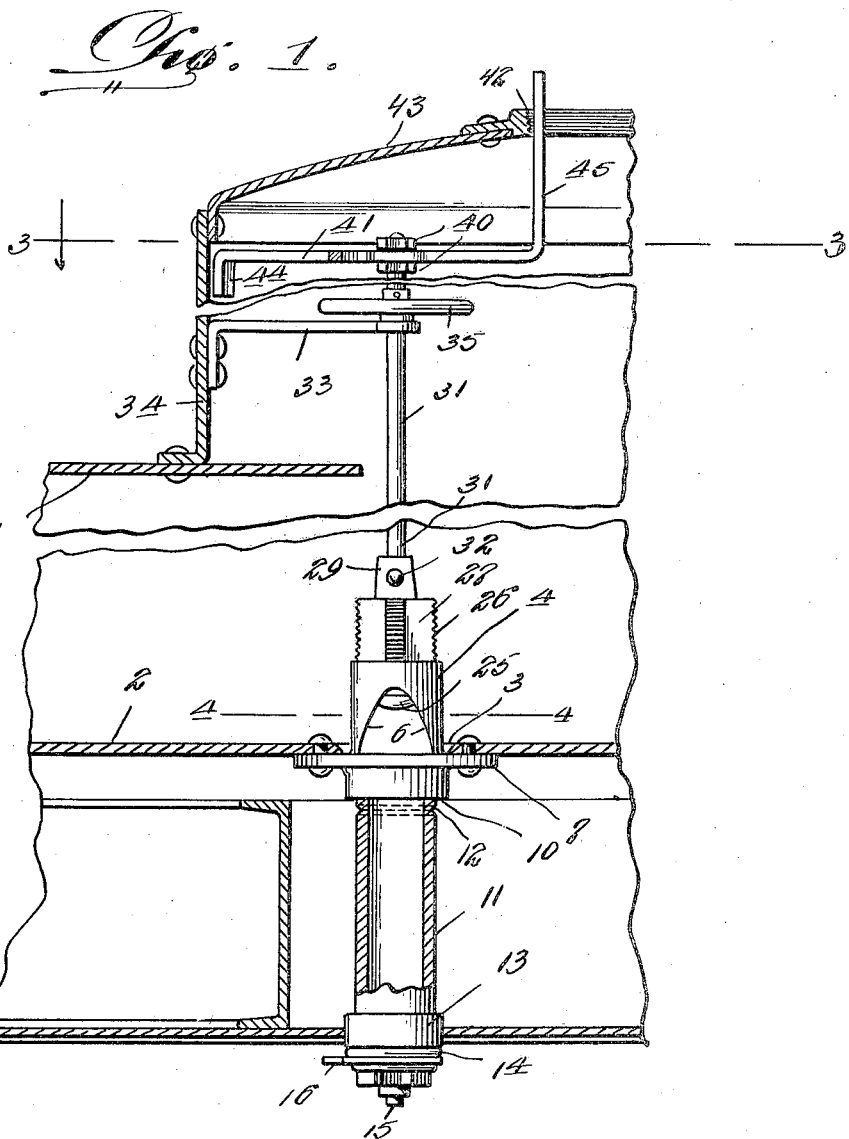
Figure 1 is a broken, vertical section, partly in elevation, of so much of a tank car as is necessary to illustrate the best practical embodiment of our present invention of which we are cognizant.
Figure 3:
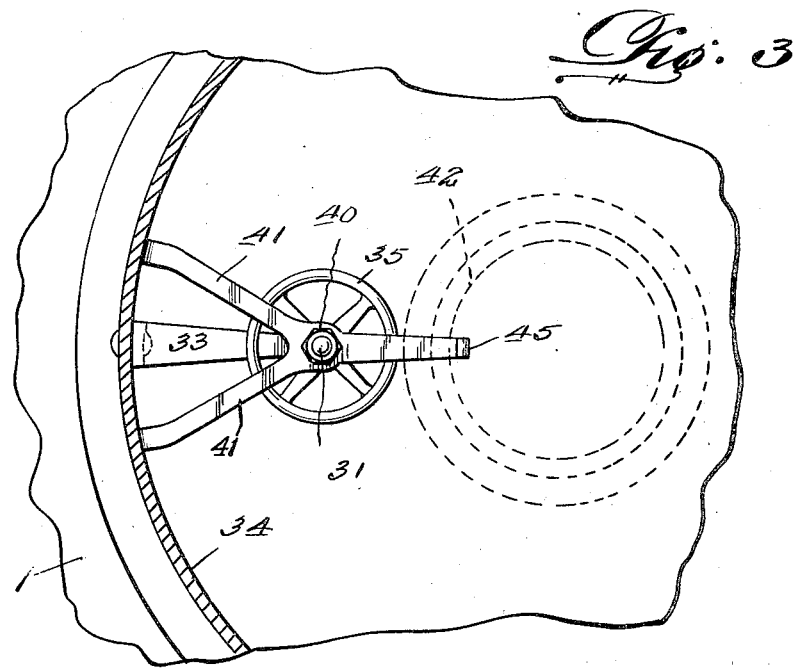
Figure 4:
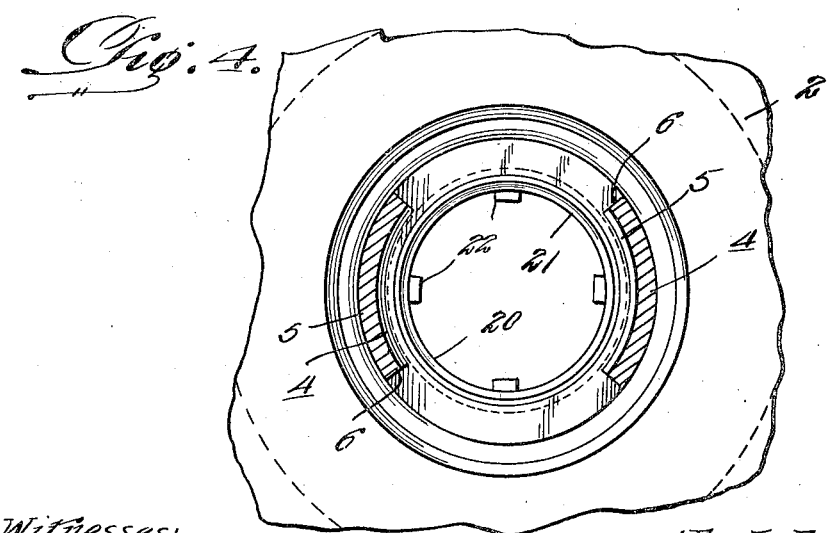

Figures 3 and 4 are horizontal sections taken in the planes indicated by the lines 3—3 and 4—4, respectively, of Figure 1, looking downwardly.

Figure 5 is an enlarged top plan view of the outlet-control valve per se.

Figure 6 is an enlarged inverted plan view of the said element.

Figure 2:
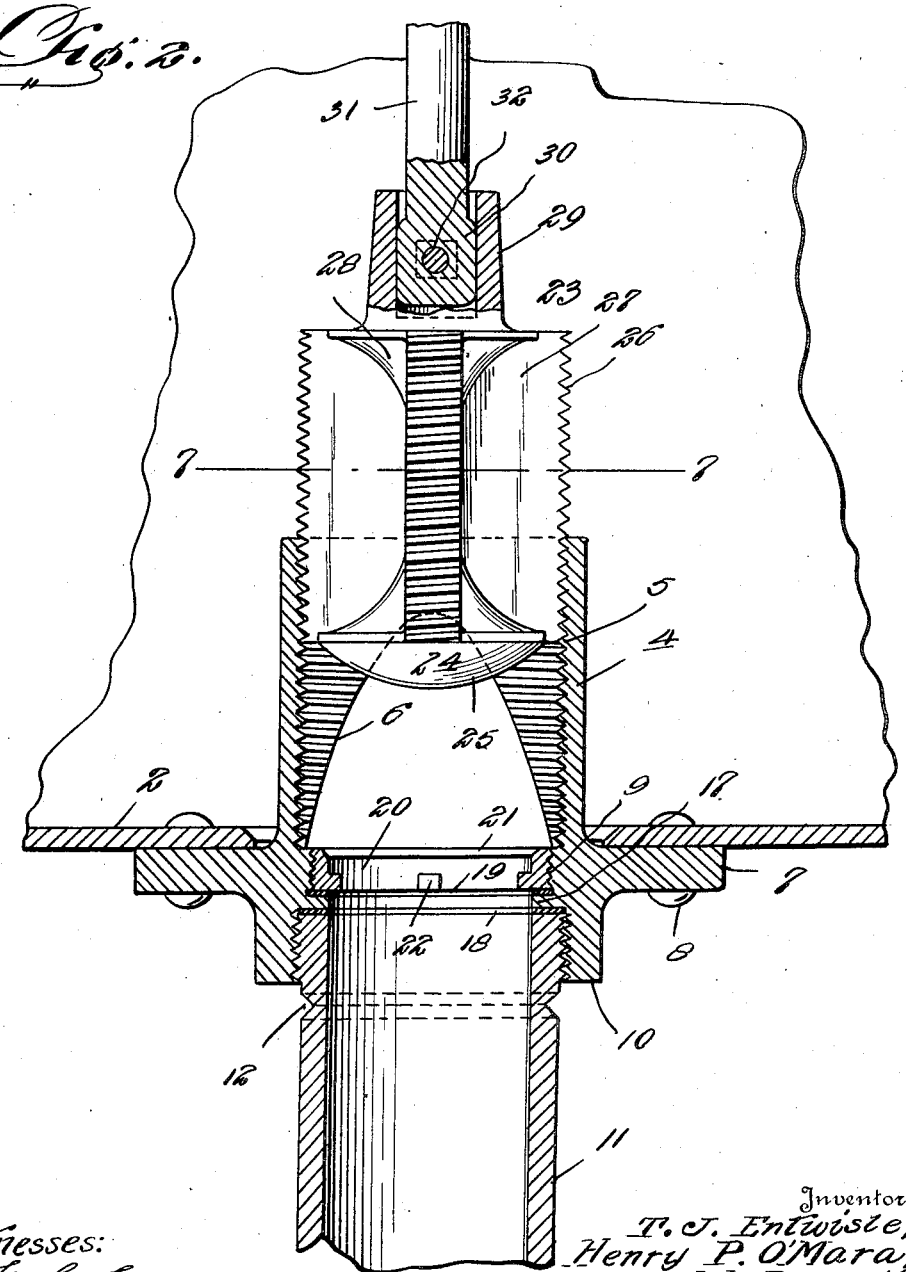
Figure 2 is an enlarged detail view showing the casing of the outlet valve in diametrical section and also showing the said valve and the connections and appurtenances of both.

Figure 7 is an enlarged intermediate horizontal section through the outlet-control valve taken in the plane indicated by the line 7—7 of Figure 2.

Figure 8 is an enlarged top plan view of the annulus that constitutes the seat for the outlet-control valve.

Similar numerals designate corresponding parts in all of the views of the drawings.

The tank body of the car is designated by 1, and in the bottom 2 of the same is provided an opening 3. In this opening 3 is arranged the valve casing 4 of our improvement, the said casing 4 being interiorly threaded as designated by 5, Figure 2, and being provided in its lower portion and above the bottom 2 with large side openings 6, preferably tapered or gradually reduced in width upwardly, and designed for the free passage of oil or other mobile substance into the valve casing from the sides of the lower portion thereof. The upper end of the casing 4 is provided with an integral, circumferential flange 7, opposed to the underside of the bottom 2 and riveted or otherwise connected thereto at 8. At a point in the same horizontal plane as the circumferential flange 7 the casing 4 is interiorly reduced in diameter and is interiorly threaded as designated by 9. Carried by said casing 4, below the circumferential flange 7 is a pendent interiorly threaded end portion 10 for the threaded connection of the usual outlet leg 11, preferably provided with the usual weakened portion 12, and with the usual cap 13, gasket 14, plug 15, and cap safety-chain connection 16 (not of our invention) shown in Figure 1. At 17 the casing has an interior annular flange, between said flange 17 and the upper end of the leg 11 is interposed an appropriate gasket 18. An appropriate gasket 19 is superimposed on the flange 17 and interposed between the same and the metallic annulus 20, Figures 2, 4 and 8, which is in threaded engagement at 9 with the casing 4 and is therefore readily removable when worn or otherwise impaired. The valve-seating portion of the annulus 20 is designated by 21, and at 22 the annulus is provided with integral, interior lugs for the engagement of an implement employed in turning the annulus into and out of threaded connection with the casing 4.

The outlet-control valve is shown in

Figures 1, 2 and 5–8, and is designated as a whole by 23. By comparison of said figures, the said outlet-control valve 23 will be readily understood to be of one piece of appropriate metal and to be made up of a body 24 with a convex face 25, a cruciform intermediate portion with threads 26 on the outer edges of its portion 28, and a socket 29 above said upper portion. The opposed sides of the body 24 and upper portion 28 are concave as illustrated to lend ample strength to said body 24 and portion 28 and yet not interfere with the free passage of oil or other mobile substance between the webs 27 and downwardly around the periphery of the body 24 when the valve is raised to the relative position shown in Figure 2. The valve 23 is opened and closed by the turning of the same about its axis with the threads 26 on the valve webs 27 in engagement with the thread 5 of the casing 4, and manifestly the valve may be strongly set against its seat with a view to precluding leakage and yet may be readily opened as occasion demands.

Disposed in the socket 29 of the valve 23 is the lower portion 30 of a valve rod 31, both socket and portion 30 being preferably of angular cross-section, and the two being connected together by a pin 32. The rod 31 is journaled in and movable vertically through a bracket 33, fixed to the side wall 34 of a dome on the body 1, and arranged above the bracket 33 and splined to or otherwise appropriately engaged with the rod 31 is a hand wheel 35 for the convenient rotation of the rod 31 to open or close the valve.

Loosely mounted on the rod 31, as between two nuts 40 threaded on the rod is an element 41 which has for its function to effectively prevent the attachment of a closure element to the threaded ring 42 on the top 43 of the tank dome until the valve 23 is completely and tightly closed. The said attachment preventing element 41 is preferably in form of a bar with an arm 44 to bear against the dome wall 34 and an arm 45 that is movable vertically through the ring 42. The said arm 45 is so arranged relative to the valve 23 and the valve seat 20 that when the valve is fully closed the arm or projection 45 is lowered to the bottom edge of the threaded portion of the ring 42 where the cover or closure element (not shown) will engage or rest upon said arm or projection when said cover or closure element is screwed home. From this it follows that the said cover or closure element is calculated to assist in preventing casual opening of the valve 23; also, that the said cover or closure element must be removed as a condition precedent to the opening of the valve 23 by the turning of the rod 31 through the medium of the wheel 35 or through the medium of any other means for the purpose. Incident to the turning of the rod or stem 31 and the raising and opening of the valve 23, the projection 45 will extend upwardly through and above the ring 42 for the purpose before indicated. The valve 23 is raised in opening to a considerable extent, and the movement of the projection 45 is considerable, thereby preventing any possible fastening of the cover or closure element until the valve 23 is fully closed.

The practical essentials of a valved outlet equipment for tank cars, all of which are manifestly met to a marked degree by our improvement as herein shown and described may be briefly stated as follows, viz:—

The valve seat should be independent of the outlet chamber, so that if the outlet chamber flange is accidentally torn off the tank, the contents of the tank will not escape. The construction should be such that the tank may be completely emptied through the valve. In order that the valve may not lift from its seat in the event of an accident separating the discharge chamber from the shell, the valve should have no wings or stem projecting below the bottom of the tank. The valve must remain seated under vapor and liquor pressure within the tank. The valve chamber or valve should not distort because of the changing contour of the shell due to lading, expansion or other usual causes. The valve should not tighten on its seat under the vibratory action of the stem. The design should be such as not to create a tendency to lock or wedge the valve on its seat. It should not be possible to displace the valve on its seat because of the movement of the car, vibration of the tank or the effect of the movement of the liquid contents of the tank. The design should not permit side-lifting of the valve because of uneven spring tension. The design should not permit displacement of the valve through pressure from below. The valve should operate from the interior of the tank, but in the event the rod is carried through the dome, leaking shall be prevented by packing in stuffing box and cap nut. The valve operating gear must have means of compensating for variations in the vertical diameter of the tank produced by expansion, weight of the liquid contents, or other usual causes.

In addition to the practical advantages hereinbefore ascribed to our improvement may be stated the following, viz:—

The valve seat and the flange are independent of the outlet chamber. The outlet chamber is capable of being renewed without removing tank from frame, or flange from tank. Sufficient area is afforded to permit complete contents of car being emptied. There is unrestricted flow, and no obstruction. Accidental breaking of valve chamber impossible to unseat valve, as no projections extend below outlet flange or bottom of tank. Valve does not depend upon wings or stem to insure proper seating of valve. Valve will remain seated under vapor, and liquid pressure within tank. Valve guide nor valve not liable to distort because of changing contour of shell due to lading, expansion or other usual causes. Valve will not tighten on its seat under vibratory action of stem. Valve so designed as not to create a tendency to lock or wedge valve on its seat. Impossible to displace valve on its seat because of movement of car, vibration of tank or the effect of movement of liquid contents in tank. Valve so designed as to prevent side-lifting because of unevenness in tension. Valve does not depend upon springs or other agencies to insure proper seating. Impossible to displace valve through pressure from below. Not necessary to seal outlet cap; valve controlled only by valve stem wheel and then only through dome. Valve operated within tank. Impossible to operate valve without removing dome cover. Valve stem designed for means of compensating for variations in the vertical diameter of tank.

We have entered into a detailed description of the construction and relative arrangement of the parts embraced in the present and preferred embodiment of my invention in order to impart a full, clear and exact understanding of the said embodiment. We do not desire, however, to be understood as confining ourselves to the specific construction and relative arrangement of parts inasmuch as in the future practice of the invention various changes and modifications may be made such as fall within the scope of our invention as defined in our appended claims.

Having described our invention, what we claim and desire to secure by Letters-Patent, is:—

1. Valved outlet equipment for tank cars including a tank body having an outlet in the bottom, an opening in the top of the body, a cover for said opening, a valve controlling said outlet mounted on the bottom, said valve having a plug axially movable in opening and closing the outlet, an operating rod connected at one end to the plug and extending substantially axially therefrom and terminating in proximity to the opening in the top of the tank body, said operating rod being rotatable in the closing and opening movement of the said body and axially movable therewith, and an arm member mounted on the end of the rod adjacent said opening and adapted to remain stationary in the rotation of the rod, having one end movable through said opening in the axial movement of the rod to prevent application of the cover when the valve is open.

2. A device for preventing application of a cover to a tank car wherein the tank car includes a tank body having an opening in the top to receive a cover, an outlet opening in the bottom below the top opening, a valve mounted in the tank body having an axially mounted in the tank body having an axially and substantially movable float controlling the outlet, an operating rod attached to one end of the valve plug and extending upwardly therefrom terminating in proximity to the opening in the top of the tank body, and a bracket for receiving the upper end of said rod; comprising a bar member mounted on and carried by the upper end of said rod, having one end portion projected laterally into the opening in the top of the tank body to prevent application of the cover when the valve is opened, and means on said bar member for preventing the rotation thereof in the rotation of the operating rod.

3. A device for preventing application of a cover to a tank car wherein the tank car includes a tank body having an opening in the top to receive a cover, an outlet opening in the bottom below the top opening, a valve mounted in the tank body having an axially and substantially movable float controlling the outlet, an operating rod attached to one end of the valve plug and extending upwardly therefrom terminating in proximity to the opening in the top of the tank body and a bracket for receiving the upper end of said rod; comprising a bar member having the central portion mounted on the upper end of said operating rod for relative rotation thereon, and having a lateral and upstanding projection on one end of said rod extending into the opening in the top of the tank body, for preventing application of the cover when the valve is opened, said rod member having a guide extension thereon at the opposite end for cooperation with a portion of the tank car body, to prevent rotation of the bar member in the opening and closing movement of the valve plugs.

4. A device for preventing application of a cover to a tank car wherein the tank car includes a tank body having an opening in the top to receive a cover, an outlet opening in the bottom below the top opening, a valve mounted in the tank body having an axially and substantially movable float controlling the outlet, an operating rod attached to one end of the valve plug and extending upwardly therefrom terminating in proximity to the opening in the top of the tank body, a bracket for receiving the upper end of said rod; comprising a bar member having the central portion mounted on the upper end of the operating rod and provided at one end with an upwardly and substantially right angular extension adapted to project into the opening in the top of the tank body, said extension being parallel with the axis of said operating rod and movable axially with said rod in the opening and closing movement of the valve plug, the opposite end of said rod being provided with a forked extension having laterally extended terminals adapted for cooperation with a portion of the tank body to prevent rotation of the bar member in the rotation of the operating rod.

In testimony whereof, we affix our signatures.

THOMAS J. ENTWISLE.
HENRY P. O'MARA.
JOSEPH W. DONNELLY.